(12) United States Patent
Lickfelt

(10) Patent No.: US 9,505,345 B1
(45) Date of Patent: Nov. 29, 2016

(54) SYSTEM AND METHOD FOR VEHICLE AMBIENT LIGHTING

(71) Applicant: Honda Motor Co., Ltd., Tokyo (JP)

(72) Inventor: Brian K. Lickfelt, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/831,954

(22) Filed: Aug. 21, 2015

(51) Int. Cl.
*B60Q 3/00* (2006.01)
*B60Q 9/00* (2006.01)
*H04N 9/04* (2006.01)
*H05B 33/08* (2006.01)

(52) U.S. Cl.
CPC .............. *B60Q 9/001* (2013.01); *H04N 9/045* (2013.01); *H05B 33/0863* (2013.01); *H05B 33/0869* (2013.01)

(58) Field of Classification Search
CPC .. H05B 37/02; H05B 37/0218; H05B 33/08; H05B 33/0845; H05B 33/0863; H05B 33/0869; B60Q 3/00; B60Q 3/01; B60Q 3/02; B60Q 3/05
USPC ........... 315/76, 77, 149, 150; 396/125, 419, 396/429
See application file for complete search history.

(56) References Cited

U.S. PATENT DOCUMENTS

| 5,975,728 A | 11/1999 | Weyer | |
|---|---|---|---|
| 6,575,607 B1 | 6/2003 | Klemish et al. | |
| 8,258,704 B2 | 9/2012 | Brant | |
| 8,476,832 B2 | 7/2013 | Prodin et al. | |
| 2006/0171704 A1* | 8/2006 | Bingle | B60R 11/04 396/419 |
| 2008/0191626 A1 | 8/2008 | Salter et al. | |
| 2013/0033582 A1* | 2/2013 | Sun | H04N 13/0018 348/47 |
| 2013/0130674 A1 | 5/2013 | DeWind et al. | |
| 2013/0322863 A1* | 12/2013 | Lee | H04N 5/23212 396/125 |
| 2014/0104464 A1* | 4/2014 | Spears | H04N 9/04 348/272 |
| 2015/0273092 A1* | 10/2015 | Holub | A61L 2/10 250/492.1 |
| 2016/0054842 A1* | 2/2016 | Yamada | G01C 21/3664 345/173 |

FOREIGN PATENT DOCUMENTS

CN 201985921 9/2011

\* cited by examiner

*Primary Examiner* — Thai Pham
(74) *Attorney, Agent, or Firm* — Rankin, Hill & Clark LLP

(57) ABSTRACT

A vehicle ambient lighting system enables a user to define a personalized ambient lighting color. The ambient lighting system includes a camera capturing image color information from a colored surface forming the user defined ambient lighting color selection. An image processor creates RGB color values representing the color of the colored surface and a generates an LED activation scheme using the RGB color values. A plurality of RGB LEDs are activated in accordance with the LED activation scheme to produce vehicle ambient lighting having a color matching the user defined ambient lighting color selection.

18 Claims, 2 Drawing Sheets

SYSTEM AND METHOD FOR VEHICLE AMBIENT LIGHTING

BACKGROUND

Vehicles typically have interior lighting for illuminating the interior of the vehicle. Vehicle interior lighting can include a variety of different illumination schemes including providing an overhead light in a flood light configuration to light the entire interior, to providing reading lights concentrating the light into tightly focused spot light configurations useful for reading.

Ambient lighting typically consists of one or more light sources which provide a soft, diffused lighting throughout much of the vehicle interior. Light emitting diodes (LEDs) are used for generating vehicle ambient illumination. White LEDs have been commonly used which provide white ambient lighting. More recently, colored ambient lighting is available. Colored light can be generated using colored lenses over white lights to produce ambient light of a predetermined color as defined by the color of the lens used. Alternatively, LEDs having a color other than white can be used. Combinations of colored Red, Green, and Blue (RGB) LEDs are also used to produce colored ambient lighting.

Many ambient lighting systems do not enable the occupant to choose the color of the ambient light illuminating the vehicle interior. Some systems provide the occupant with a limited choice of preselected ambient lighting colors to choose from. It is desirable to enable the occupant to select her own, personalized color of ambient light for illuminating the vehicle interior.

BRIEF DESCRIPTION

In accordance with one aspect of the disclosure, a vehicle ambient lighting system for producing personalized, user-defined color of ambient light is provided. The vehicle ambient lighting system includes a camera having an image sensor capturing image color information from a colored surface forming a user defined ambient lighting color selection. An image processor operably connected to the image sensor receives the image color information and create RGB color values representing the color of the colored surface. A controller processor operably connected to the image processor generates a light emitting diode (LED) activation scheme, and an LED driver activates a plurality of RGB LEDs in accordance with the LED activation scheme to produce vehicle ambient lighting having a color which matches the color of the ambient lighting color selection.

In accordance with another aspect of the disclosure, a vehicle ambient lighting system for producing user-defined color of ambient light using a human machine interface is provided. The vehicle ambient lighting system includes a camera having an image sensor capturing image color information from a colored surface forming a user defined ambient lighting color selection. An image processor operably connected to the image sensor receives the image color information and creates red, green, blue (RGB) color values representing the color of the colored surface. A controller having a processor operably connected to the image processor for generates a light emitting diode (LED) activation scheme using the RGB color values. A human machine interface provides a user interface for operating the vehicle ambient lighting. An LED driver is connected to the controller for activating a plurality of RGB LEDs in accordance with the LED activation scheme to produce vehicle ambient lighting having a color matching the user defined ambient lighting color selection.

In accordance with another aspect of the disclosure, a method of generating colored vehicle ambient lighting is provided. The method includes presenting a colored surface forming a user defined ambient lighting color selection to a vehicle camera image sensor, triggering the camera to capture image color information from the colored surface, creating RGB color values representing the color of the colored surface, generating an LED activation scheme using the RGB color values, and activating a plurality of RGB LEDs in accordance with the LED activation scheme to generate vehicle ambient lighting having a color matching the user defined ambient lighting color selection.

DETAILED DESCRIPTION

It should, of course, be understood that the description and drawings herein are merely illustrative and that various modifications and changes can be envisioned without departing from the present disclosure. It will also be appreciated that the various identified components of the exemplary vehicle ambient lighting system disclosed herein are merely terms of art that may vary from one manufacturer to another and should not be deemed to limit the present disclosure.

Figure 1:
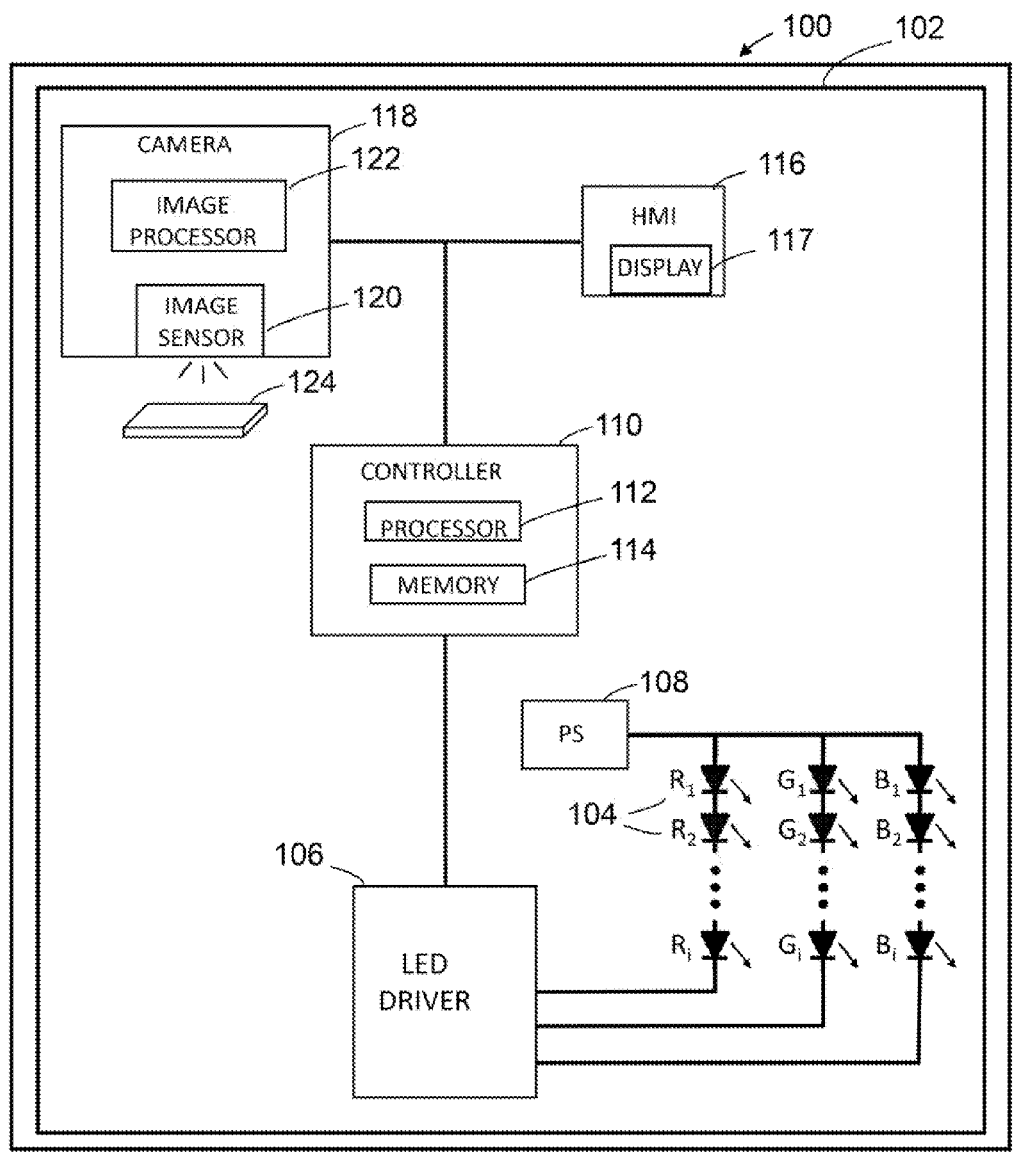
FIG. 1 is a schematic illustration of a system for generating personalized color of vehicle ambient lighting according to the present disclosure.

The embodiments will now be described with reference to the accompanying drawings, wherein like reference numerals designate corresponding or identical elements throughout the various drawings. Referring now to FIG. 1, a schematic illustration of a vehicle is shown generally at 100. The vehicle can be a car, truck, minivan, sport utility vehicle and other type of vehicle having an interior ambient lighting system 102. The vehicle ambient lighting system 102 includes a plurality of light emitting diodes (LEDs) which include Red ($R_1, R_2, \ldots R_i$), Green ($G_1, G_2, \ldots G_i$) and Blue ($B_1, B_2, \ldots B_i$) diodes, also known an RGB LEDs 104, which are activated to produce ambient lighting to illuminate the interior of the vehicle 100. The RGB LEDs 104 can also include a plurality of clear LEDs, if so desired.

An LED driver 106 is electrically connected to the RGB LEDs 104 to selectively activate the individual red, green and blue LEDs to any desired illumination intensity thereby creating light of variable intensity having any desired color. One or more power supplies 108 provide the RGB LEDs 104 with sufficient voltage and current to provide the wide range of illumination intensity sufficient for generating any desired color.

A controller 110 is operatively coupled to the LED driver 106 for controlling the operation of the ambient lighting system 102. The controller 110 is a computing device which includes one or more processors 112 programmed to perform computer-executable instructions embodied computer-readable storage media or memory 114. When executed by at the least one processor 112, the computer-executable instructions cause the processor to perform the operations described herein, including controlling the ambient lighting system 102 to create a personalized, user-defined color of illumination.

The controller 110 provides the LED driver 106 with an LED activation scheme for activating select RGB LEDs 104 to sufficient respective illumination intensities so that the combined effect produces ambient light of variable intensity having any desired color, as described in further detail below. The controller 110 can also control the ambient lighting system 102 in a variety of conventional manners such as turning the ambient lighting system on and off, controlling general illumination intensity, lighting different locations within the vehicle, etc.

A human machine interface (HMI) 116 is operatively coupled to the controller 110 for enabling a user to operate the ambient lighting system 102. The HMI 116 can include a display 117, such as for example a touch screen, having a graphical user interface. The user can control the ambient lighting system 102 using the HMI 116 to produce ambient lighting of any desired color in a manner described in further detail below.

The vehicle 100 includes a camera 118 for use in the ambient lighting system 102. The camera 118 can be a dashboard camera, a backup camera, or any other suitable camera having a color image sensor 120 capable of capturing a color image, also referred to as a digital picture. The image sensor 120 can be a semiconductor charge-coupled devices (CCD), or active pixel sensors in complementary metal-oxide-semiconductor (CMOS), or other known image sensors used in cameras.

The camera 104 includes an image processor 122 which receives color image data for an object captured by the image sensor 120 when the camera is triggered to take a picture. In the examples described herein, the object is a colored surface 124 having a color of desired ambient lighting. The colored surface 124 can be a color swatch, a paint chip, a photograph, or any colored surface from which the user intends to create matching colored ambient lighting in the vehicle 100. The image processor 122 receives the color image data from the image sensor 120 and creates RGB color values which represent the color of the colored surface 124. The RGB color values are derived in accordance with an RGB color model appropriate for the specific RGB LEDs 104 used in the ambient lighting system. This RGB color model can be predetermined using LED data supplied at the time of manufacture of the ambient lighting system 102. In one example, the RGB color model can be an sRGB color model. In another example, the RGB color model can be Adobe RGB, which includes a larger range (gamut) of colors than sRGB, especially in the blues and cyans, to produce a larger variety of ambient lighting colors. The RGB color model can be updated or refined at periodic intervals, if so desired.

The controller 110 receives the RGB values from the image processor 122. In one non-limiting example, the RGB color values can be stored in a color look-up table in the controller's memory 114. The controller 110 creates an RGB LED activation scheme using the RGB color values for selectively activating the LEDs 104 with sufficient intensity such that the combined effect produces ambient illumination having a color which matches the color of the colored surface 124. The controller 110 communicates with the LED driver 106 using the LED activation scheme for activating the LEDs to produce the colored ambient light. Some or all of the RGB LEDs 104 can be illuminated to produce the appropriate color.

Figure 2:
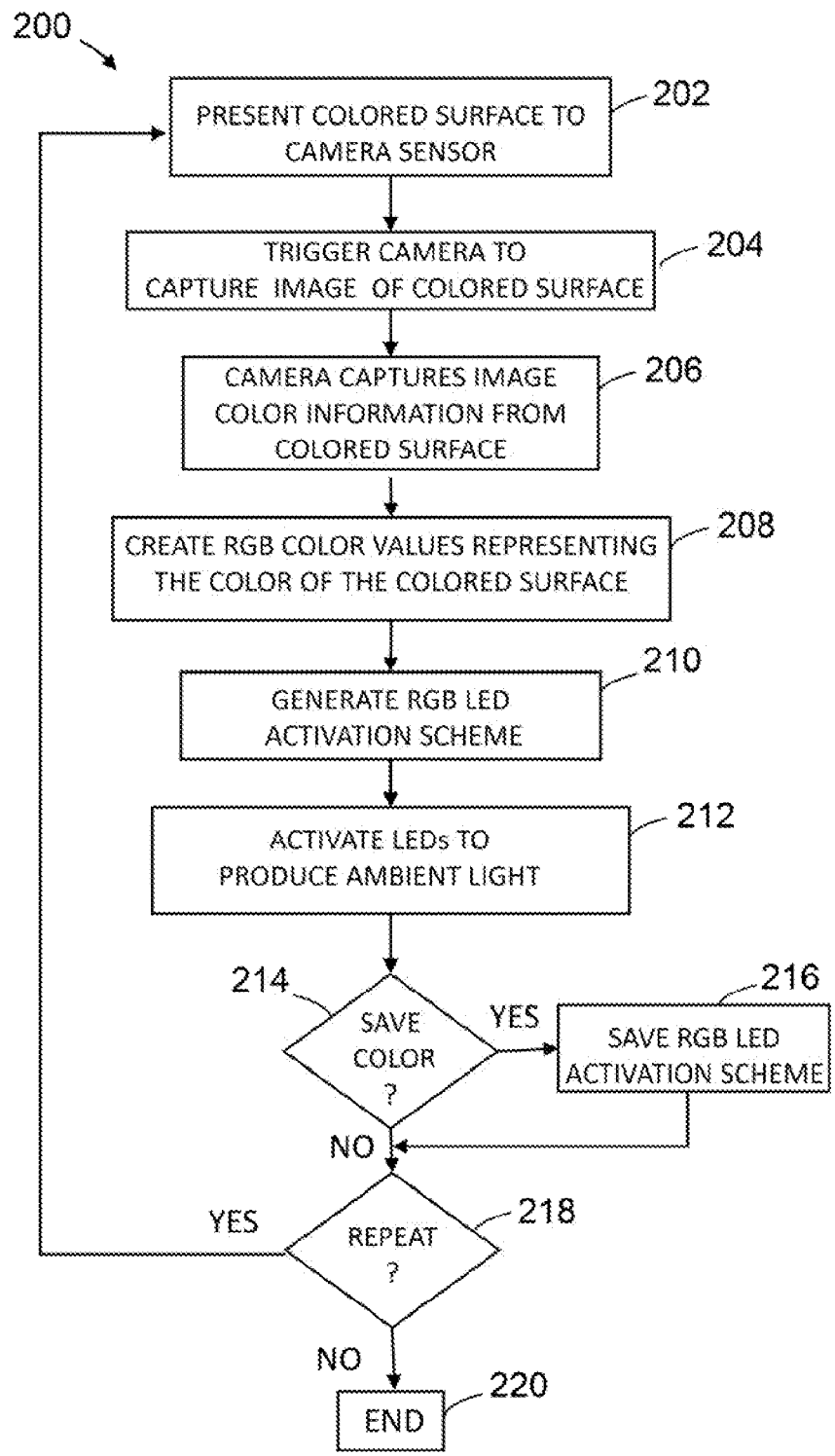
FIG. 2 is a flow diagram of a method of generating a personalized vehicle ambient lighting color for the system of FIG. 1.

Referring now to FIG. 2, a method of generating vehicle ambient lighting having a personalized, user-defined color is shown generally at 200. A user operates the ambient lighting system 102 using an HMI 116 described above. The user begins operating the ambient lighting color selection routine using the HMI GUI. The user is instructed to present a colored surface to the camera at 202 and trigger the activation of the camera. Upon receiving the trigger signal at 204, the camera 118 takes an image of the color surface capturing image color information at 206 and sends the image data to the image processor 122. The image processor 122 generates RGB color values representing the color of the colored surface at 208.

The image processor 122 sends the RGB color values to the controller 110 which generates an RGB LED activation scheme at 210 for activating select RGB LEDs at suitable intensities to generate ambient lighting having a color which matches the color of the colored surface, as described above. The controller 110 communicates with the LED driver 106 using the RGB LED activation scheme to activate the RGB LEDs 104 at 212 and produce interior ambient light having a color which matches the color of the colored surface corresponding to the user defined ambient lighting color selection.

The HMI 116 then queries the user at 214, generating a request to save the LED activation scheme. Upon receiving an indication from the user to save the LED activation scheme in response to the request, the LED activation scheme is saved in memory at 216. The HMI can request that the user enter a storage identifier for the LED activation scheme, if so desired. Thus, the ambient lighting color selection can thus be saved using any suitable naming convention.

The LED activation scheme can be saved in association with the user, such as for example, by using a user ID or account number, or in any other suitable manner. The LED activation scheme can be saved in association with the owner of the fob that previously started the vehicle, or activated the ignition. The LED activation scheme is discarded, if it is not saved.

The HMI then queries the user at 218, generating a request to create another user defined ambient lighting color selection. Upon receiving an indication from the user to proceed, the process is repeated beginning again at 202. Alternatively, the process ends at 220.

The system and method of generating user defined ambient lighting colors disclosed herein enables a vehicle owner to chose a color to match her exact mood and desire, thereby creating a more personalized driving experience.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle ambient lighting color selection system comprising:
   a camera having an image sensor and an image processor, wherein the image sensor captures image color information from a colored surface forming a user defined ambient lighting color selection
   and the image processor operably connected to the image sensor for receiving the image color information and creating red, green, blue (RGB) color values representing the color of the colored surface;

a controller having a processor operably connected to the image processor for generating a light emitting diode (LED) activation scheme using the RGB color values;

a plurality of a red, green, blue (RGB) LEDs; and an LED driver connected to the controller for activating the plurality of RGB LEDs in accordance with the LED activation scheme to produce vehicle ambient lighting having a color matching the user defined ambient lighting color selection.

2. The vehicle ambient lighting system of claim 1, wherein the controller further comprises:

a memory for storing the LED activation scheme.

3. The vehicle ambient lighting system of claim 2, wherein the memory stores the LED activation scheme in association with a user.

4. The vehicle ambient lighting system of claim 2, further comprising a human machine interface (HMI) connected to the processor providing user control of the ambient lighting system.

5. The vehicle ambient lighting system of claim 4, wherein the human machine interface (HMI) includes a graphic user interface providing instruction to a user to present the colored surface to the camera and trigger the camera to capture the image color information from the colored surface.

6. The vehicle ambient lighting system of claim 4, wherein the human machine interface (HMI) generates a request to save the LED activation scheme corresponding to the user defined ambient lighting color selection after activation of the RGB LEDs displays the vehicle ambient lighting.

7. The vehicle ambient lighting system of claim 2 wherein the human machine interface (HMI) requests a storage identifier for the LED activation scheme for referring to the saved ambient lighting color selection.

8. The vehicle ambient lighting system of claim 1, further comprising a trigger for activating the camera for capturing the image color information from a colored surface, wherein the trigger is at least one of a fob, a switch, and a human machine interface (HMI).

9. A vehicle ambient lighting color selection system comprising:

a camera having an image sensor capturing image color information from a colored surface forming a user defined ambient lighting color selection;

an image processor operably connected to the image sensor for receiving the image color information and creating red, green, blue (RGB) color values representing the color of the colored surface;

a controller having a processor operably connected to the image processor for generating a light emitting diode (LED) activation scheme using the RGB color values;

a human machine interface (HMI) operably connected to the controller for providing a user interface for operating the vehicle ambient lighting;

a plurality of a red, green, blue (RGB) LEDs; and an LED driver connected to the controller for activating the plurality of RGB LEDs in accordance with the LED activation scheme to produce vehicle ambient lighting having a color matching the user defined ambient lighting color selection.

10. A method of generating colored vehicle ambient lighting comprising:

presenting a colored surface forming a user defined ambient lighting color selection to a vehicle camera image sensor via a camera;

capturing image color information from the colored surface with the camera image sensor;

creating red, green, blue (RGB) color values from the image color information representing the color of the colored surface;

generating an LED activation scheme using the RGB color values; and activating a plurality of RGB LEDs in accordance with the LED activation scheme to generate vehicle ambient lighting having a color matching the user defined ambient lighting color selection.

11. The method defined in claim 10 further comprising saving the LED activation scheme in association with a user.

12. The method defined in claim 10 further comprising a human machine interface (HMI) generating a request to save the LED activation scheme corresponding to the user defined ambient lighting color selection.

13. The method defined in claim 12 further comprising:

receiving an indication to save the LED activation scheme from a user in response to the request; and saving the LED activation scheme in memory.

14. The method defined in claim 12 further comprising:

receiving an indication to create another user defined ambient lighting color selection; and repeating the presenting, capturing, creating, generating, and activating steps.

15. The method defined in claim 10 further comprising triggering the camera to capture an image of the colored surface.

16. The method defined in claim 15 wherein the triggering uses at least one of a fob, a switch and a human machine interface (HMI).

17. The method defined in claim 15 further comprising the human machine interface (HMI) instructing a user to perform the presenting and triggering.

18. The method defined in claim 12 further comprising:

requesting a storage identifier for the LED activation scheme for referring to the saved ambient lighting color selection; and saving the LED activation scheme in association with the storage identifier.

\* \* \* \* \*